US007497331B2

(12) United States Patent
Pham

(10) Patent No.: US 7,497,331 B2
(45) Date of Patent: Mar. 3, 2009

(54) CHILD RESISTANT PACKAGE

(75) Inventor: Tang B. Pham, Milford, OH (US)

(73) Assignee: Duramed Pharmaceuticals, Inc., Pomona, NY (US)

(*) Notice: Subject to any disclaimer, the term of this patent is extended or adjusted under 35 U.S.C. 154(b) by 554 days.

(21) Appl. No.: 11/121,134

(22) Filed: May 4, 2005

(65) Prior Publication Data

US 2006/0249421 A1 Nov. 9, 2006

(51) Int. Cl.
 *B65D 83/04* (2006.01)
(52) U.S. Cl. .................... 206/531; 206/528; 206/532; 206/538
(58) Field of Classification Search ............. 206/531, 206/528–530, 534.1, 538, 539, 828
 See application file for complete search history.

(56) References Cited

U.S. PATENT DOCUMENTS

| 3,473,655 | A |   | 10/1969 | Keating, Jr. |         |
|-----------|---|---|---------|--------------|---------|
| 3,835,995 | A | * | 9/1974  | Haines       | 206/536 |
| 3,872,970 | A | * | 3/1975  | Edison       | 206/532 |
| 3,921,805 | A |   | 11/1975 | Compere      |         |
| 3,941,248 | A | * | 3/1976  | Moser et al. | 206/531 |
| 4,011,949 | A | * | 3/1977  | Braber et al.| 206/532 |
| 4,125,190 | A | * | 11/1978 | Davie et al. | 206/532 |
| 4,243,144 | A |   | 1/1981  | Margulies    |         |
| 4,294,361 | A | * | 10/1981 | Margulies et al. | 206/532 |
| 4,305,502 | A | * | 12/1981 | Gregory et al.   | 206/532 |
| 4,988,004 | A |   | 1/1991  | Intini        |         |
| 5,325,968 | A |   | 7/1994  | Sowden        |         |
| 5,339,960 | A | * | 8/1994  | Price         | 206/531 |
| 5,358,118 | A | * | 10/1994 | Thompson et al.  | 206/538 |
| 5,758,774 | A | * | 6/1998  | Leblong       | 206/531 |
| 5,785,180 | A |   | 7/1998  | Dressel et al. |         |
| 5,927,500 | A | * | 7/1999  | Godfrey et al. | 206/531 |
| 6,659,280 | B2| * | 12/2003 | Paliotta et al. | 206/531 |
| 6,705,467 | B1| * | 3/2004  | Kancsar et al. | 206/531 |
| 6,830,153 | B2| * | 12/2004 | French et al. | 206/538 |
| 7,188,728 | B2| * | 3/2007  | Williams-Hartman | 206/532 |
| 2003/0111379 | A1 | * | 6/2003 | Intini     | 206/531 |
| 2004/0222122 | A1 |   | 11/2004 | Intini     |         |

OTHER PUBLICATIONS

Notification of Transmittal of the International Search Report and the Written Opinion of the International Searching Authority; International Search Report; and Written Opinion of the International Searching Authority for International application No. PCT/US2006/016079, mailed on Aug. 14, 2006.

* cited by examiner

*Primary Examiner*—Jila Mohandesi
*Assistant Examiner*—Jose S Stephens, III
(74) *Attorney, Agent, or Firm*—Sterne, Kessler, Goldstein & Fox P.L.L.C.

(57) ABSTRACT

A child resistant drug package. The package includes a blister layer having at least one blister and a plurality of backing layers covering the blister layer. The backing layers include tabs that require sequential removal in order to gain access to the contents of the blister.

9 Claims, 4 Drawing Sheets

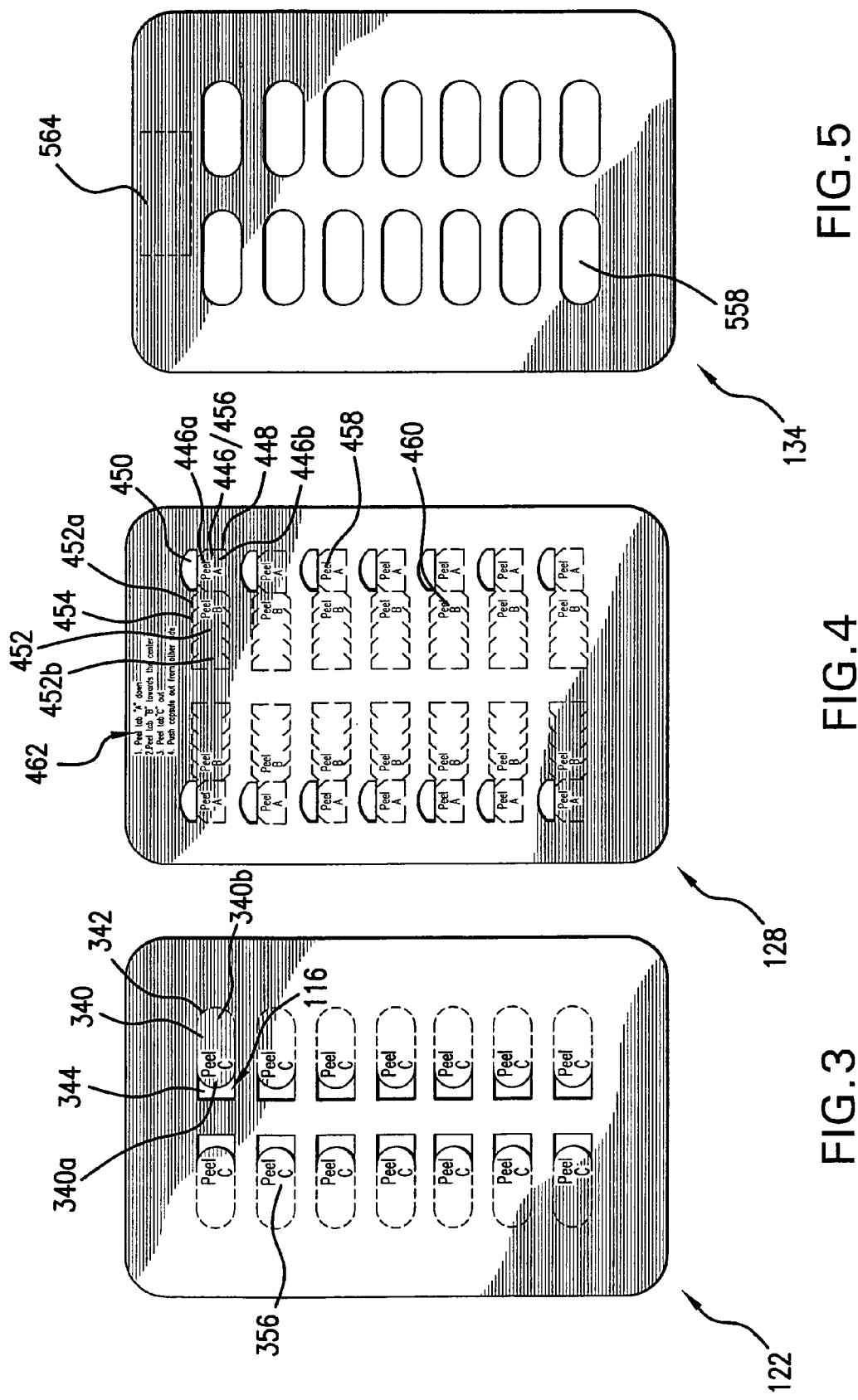

CHILD RESISTANT PACKAGE

BACKGROUND OF THE INVENTION

1. Field of the Invention

The field of this invention generally relates to packaging for drugs, and more particularly to a child resistant package for drugs.

2. Background of the Invention

The incorporation of child resistant features on drug packaging is well recognized as a significant factor in the reduction of childhood poisoning caused by ingestion of hazardous materials. In fact, the child resistance of packaging was such a significant factor that the U.S. Poison Prevention Packaging Act was enacted requiring packaging of certain materials to meet minimum standards of child resistance. Many packaging designs have been developed in order to meet the standards outlined in the Act.

One child resistant package design is found, for example, in U.S. Pat. No. 4,988,004. The design includes a blister sheet defining drug carrying blisters, a foil sheet that covers the blister sheet and encloses the blisters, and a reinforcing layer coupled to the foil sheet opposite to the blister sheet. The reinforcing layer includes perforated pull tabs that extend over the blister. An end of each pull tab lies flat against but is not coupled to the foil sheet. When used as designed, the package is bent, which causes the unsealed end of a pull tab to lift so that the user can grasp it and pull it off from over the foil covering the blister. After the tab is removed, a portion of the foil that covers the blister becomes exposed and the user pushes the contents of the blister through the foil. A disadvantage of such a design is that there is only one layer that provides any substantial child resistance. If the package is damaged or if a child is able to surpass that feature, the drug enclosed therein becomes easily accessible. A further disadvantage of the design is that the perforations that define the peel tabs extend to the outer edge of the package making it easier for the pull tabs to be removed by manipulating the outer edge of the package.

Another package design is found in U.S. Pat. No. 5,325,968. That design includes a blister sheet that includes drug carrying depressions and access depressions. A peelable sheet covers the depressions and encloses dosages within the drug carrying depression. A user is required to remove a portion of the peelable sheet that covers an access depression in order to grip a second portion of the peelable sheet that covers the drug carrying depression. The peelable sheet may be peeled from the drug carrying depression to gain access to the packaged drug. A shortcoming of the design is that, after the second portion of the peelable sheet covering one of the drug carrying depressions is removed, access to another drug carrying depression is made easier. In addition, there is only one sheet of material covering the drug carrying depression so if the package is damaged the drug may become exposed.

In another design, shown in U.S. Pat. No. 5,785,180, a child resistant package includes a blister sheet defining drug carrying blisters, a rupturable layer that seals the blisters and a nonrupturable layer that covers the rupturable layer. For each blister, a perforated pull tab is included on the nonrupturable layer that is designed to be difficult to remove. A user is required to pull the pull tab in a first direction and subsequently pull the same pull tab in a second direction perpendicular to the first direction. If the user is able to pull the tab as designed, the portion of the rupturable layer enclosing the associated blister becomes exposed so that the user can gain access to the contents of the blister by causing the rupture of the rupturable layer. One disadvantage of the package is that if the user does not pull the tab as designed, the tab will tear before being completely removed and a portion of the tab will remain over the blister, hindering access to the contents. A further disadvantage is that there is only one pull tab that forms a significant line of defense prior to gaining access to a potentially harmful substance.

Another package includes a blister layer defining drug carrying blisters, that is covered by a rupturable layer, an intermediate layer and a top layer, as shown in U.S. Pat. No. 5,339,960. The intermediate layer includes bendable breakaway panels defined by score lines that cover the rupturable layer. The top layer covers the intermediate layer and includes access panels that intersect the edge of the package. After removal of an access panel of the top layer, the user presses the associated blister and the contents is forced through the rupturable layer and past the bendable breakaway panel. Although the design includes dual layers covering the rupturable layer, only one easily removable access panel must be removed prior to gaining easy access to the contents of the associated blister.

SUMMARY OF THE INVENTION

There is a need for a package that requires a series of steps performed in a designed sequence before access to a dosage carrying cavity is obtained.

In an embodiment of the present invention, a child resistant package includes a blister layer having at least one blister, an inner backing layer and an outer backing layer. The blister extends toward a top surface of the blister layer. The inner backing layer has a top surface, a bottom surface and an access tab. The top surface of the inner backing layer is coupled to a bottom surface of the blister layer, the bottom surface of the inner backing layer is coupled to a top surface of the outer backing layer and the access tab is disposed adjacent to the blister in the blister layer. The outer backing layer includes a cover tab that is disposed adjacent to the access tab and a lock tab that is disposed adjacent to the cover tab.

In another embodiment, a child resistant package includes a blister layer including a blister, a lidding layer and a backing layer. The lidding layer is coupled to the blister layer. The backing layer is coupled to the lidding layer and includes a first access system and a second access system. The first access system is disposed adjacent to the blister. The second access system is a multi-step access system. The second access system is located adjacent to the first access system and the second access system is configured to communicate with the first access system such that the first access system is accessible via the second access system.

In another embodiment, a child resistant package includes a blister layer including a blister, an inner backing layer and an outer backing layer. The inner backing layer is coupled to the blister layer and includes a first access system located adjacent to the blister. The outer backing layer is coupled to the inner backing layer and includes a second access system. The second access system includes multiple sequential peel tabs. The second access system is located adjacent to the first access system and is configured to communicate with the first access system such that the first access system is accessible via the second access system.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS/FIGURES

Features, aspects and advantages of the present invention will become better understood with reference to the following description, appended claims, and accompanying drawings, which are not to scale.

FIG. 3 is a plan view of one component of the child resistant package of FIG. 1.

FIG. 4 is a plan view of another component of the child resistant package of FIG. 1.

FIG. 5 is a plan view of another component of the child resistant package of FIG. 1.

DETAILED DESCRIPTION OF THE INVENTION

The present invention is now described with reference to the figures where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention.

Figure 1:
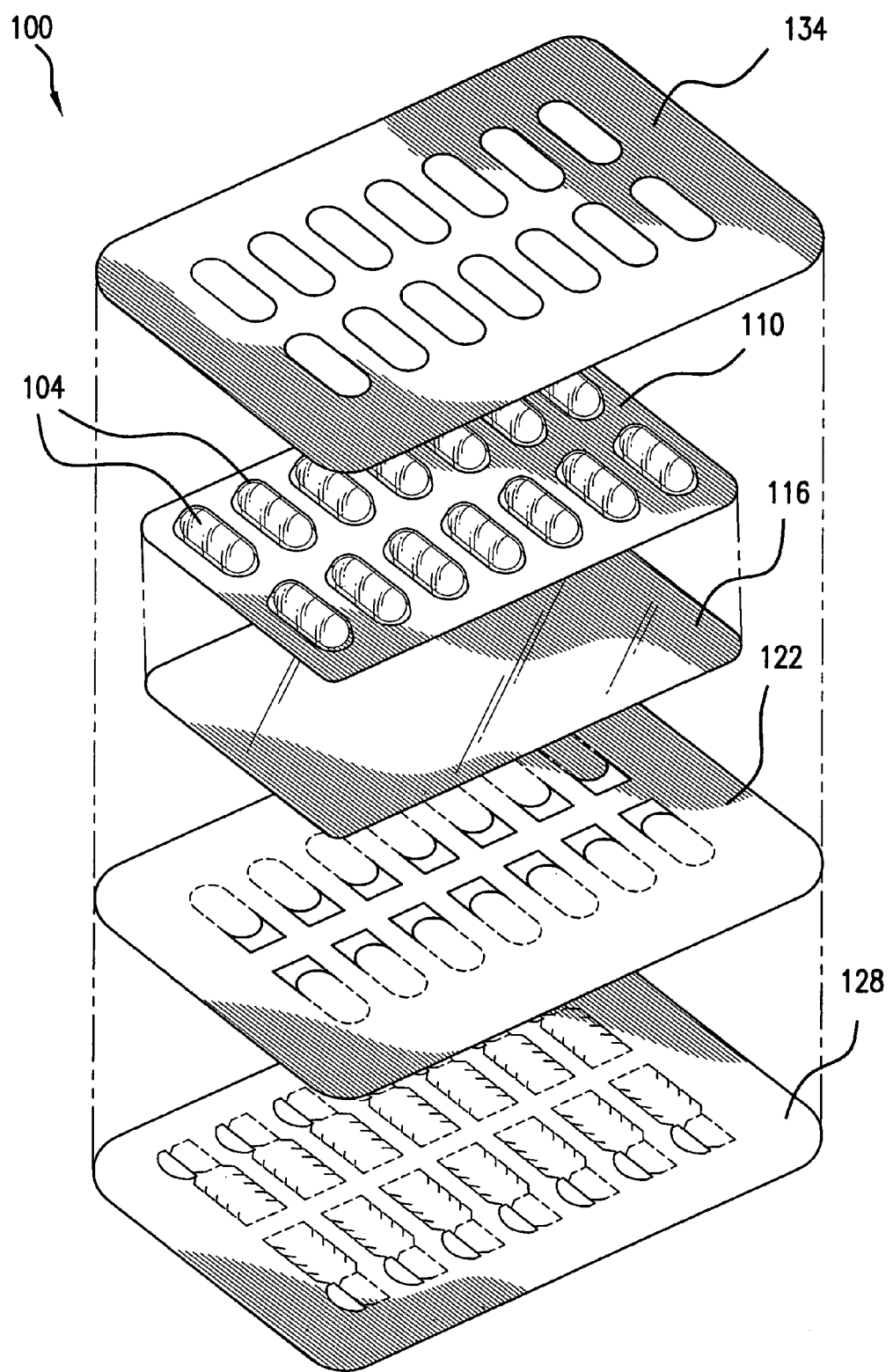
FIG. 1 is an exploded view of a child resistant package of the present invention.
Figure 2:
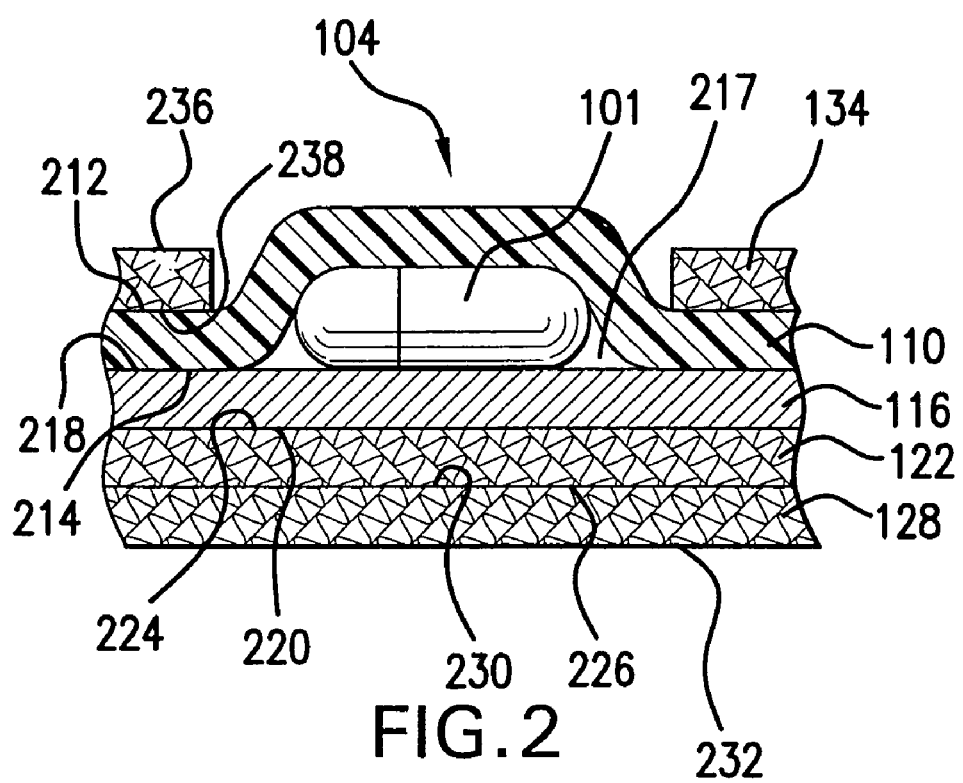
FIG. 2 is a cross-sectional view of a portion of the child resistant package of FIG. 1.

As shown in FIGS. 1 and 2, child resistant package 100 is constructed with a plurality of layers that include a blister layer 110, a lidding layer 116, a inner backing layer 122, a outer backing layer 128 and a cover layer 134. Blister layer 110 has a top surface 212, a bottom surface 214 and a plurality of blisters 104 formed therein. Blisters 104 are convex with respect to top surface 212 and concave with respect to bottom surface 214. Blisters 104 are configured to receive at least one unit dosage 101 of a medicament and may be any shape desirable to receive a particular dosage form. For example, blisters 104 are elongated. The elongated shape is particularly well-suited to receive cylindrical dosages such as capsules, caplets or elongated tablets or gel tabs. As a further example, blisters 104 may be circular to accommodate round tablets or capsules or blisters 104 may be an irregular shape to accommodate, or example, bullet shaped suppositories, other irregular shaped dosage forms or multiple dosages (e.g., multiple tablets in a single blister).

Blister layer 110 may be constructed from any material that is compatible with the packaged drug and capable of providing the structure necessary to house the dosage. The blister layer material for example may be any thermoformable material or a material that provides moisture barrier properties. For example, blister layer 110 may be constructed from ACLAR chlorotrifluoroethylene (CTFE) homopolymer barrier film available from Honeywell International Inc. In an embodiment, blister layer 110 is constructed from a barrier film that includes a 10 mil layer of polyvinyl chloride (PVC) with a 0.6 mil layer of ACLAR Rx160 CTFE homopolymer available from Kockner Pentaplast of America of Gordonsville, Va. In addition the material used for blister layer 110 may be selected and processed so that blisters 104 are crushable. In another embodiment, the blister layer may be constructed from Polyvinylidene Chloride (PVDC), an aluminum foil or any other crushable film material known in the art.

A top surface 218 of lidding layer 116 is coupled to bottom surface 214 of blister layer 110. Lidding layer 116 covers blisters 104 to create enclosed cavities 217. Lidding layer 116 is coupled and sealed to bottom surface 214 of blister layer 110, for example by a seal around the perimeter of package 100 or around the perimeter of each of blisters 104.

Lidding layer 116 is a rupturable material that provides a moisture barrier between the environment and cavities 217 formed by blister layer 110 and lidding layer 216. For example, lidding layer 116 may be constructed from foil such as 20 micron push thru foil commercially available from Alcan Packaging of Shelbyville, Ky.

A top surface 224 of inner backing layer 122 is coupled to a bottom surface 220 of lidding layer 116. Inner backing layer 122 includes one or more access tabs 340, as shown in FIG. 3, which are configured to be peeled off by a user. Each of access tabs 340 has a first end 340a for grasping by a user and a second end 340b that is connected to inner backing layer 122 at tear line 342. As shown, tear line 342 is a line of perforations extending through a thickness of inner backing layer 122. Alternatively, tear line 342 may be a line of weakening formed by cuts extending through less than the entire thickness of inner backing layer 122.

A first access hole 344 is provided to allow a user to grasp first end 340a of each access tab 340 so that it can be removed. Once access tab 340 is removed, a portion of lidding layer 116 that encloses a blister 104 is exposed. Access tab 340 and access hole 344 combine to form a first access system. Although only one access tab is shown, is should be appreciated that first access system may include multiple tabs.

Inner backing layer 122 is constructed from a non-rupturable material that is resistant to tearing. For example, inner backing layer 222 may be constructed from a card material such as 16 pt EZ Seal Plus Paper, manufactured by Meadwestvaco of Mebane, N.C.

A top surface 230 of outer backing layer 128 is coupled to a bottom surface 226 of inner backing layer 122. In the present embodiment, outer backing layer 128 includes cover tabs 452 and lock tabs 446. Lock tabs 446 and cover tabs 452 are configured to be sequentially peeled off by a user in order to gain access to access tabs 340 of inner backing layer 122. Lock tabs 446 are defined by tear lines 448 and a side of access holes 450, and each lock tab 446 includes a first end 446a for grasping by a user and a second end 446b. Cover tabs 452 are defined by tear lines 454 and a side of lock tabs 446, and each cover tab 452 includes a first end 452a for grasping by a user and a second end 452b.

Each cover tab 452 is configured so that it covers at least one access tab 340 provided in inner backing layer 222. In the present embodiment, each cover tab 452 covers only one access tab 340. Lock tab 446 is located immediately adjacent to one side of cover tab 452 such that lock tab 446 must be removed before a user is able to grasp first end 452a of cover tab 452.

Each access hole 450 is located immediately adjacent a first end 446a of each lock tab 446 and spaced from all sides of cover tab 452. Thus, a user cannot mistakenly remove cover tab 452 without removing lock tab 446. Access hole 450 allows a user to grasp and remove lock tab 446. Lock tab 446, cover tab 452 and access hole 450 combine to form a second access system that is multi-step.

As shown, tear lines 454 and 448 are lines of perforations extending through a thickness of outer backing layer 128. Alternatively, tear line 454 and/or tear line 448 may be a line of weakening formed by cuts extending through less than the entire thickness of outer backing layer 128.

Outer backing layer 128 is constructed from a non-rupturable material that is resistant to tearing and may be constructed from the same material as inner backing layer 122. For example, outer backing layer 128 may be constructed from a card material such as 16 pt EZ Seal Plus Paper, manufactured by Meadwestvaco of Mebane, N.C.

Outer backing layer 128 may be coupled to inner backing layer 122 by an adhesive. In the present embodiment, outer backing layer 128 is adhered with a permanent adhesive to portions of inner backing layer 122 away from access tabs 340.

A cover layer 134 is also included in child resistant package 100. Cover layer 134 is coupled to top surface 212 of blister layer 110. As shown in FIG. 5, cover layer 134 includes a plurality of blister apertures 558. Blister apertures 558 are configured such that when cover layer 134 is coupled to blister layer 110, blisters 104 are received by apertures 558 and extend therethrough. As a result, only the portions of blister layer 110 that include blisters 104 are exposed.

The outer dimensions of blister layer 110 and lidding layer 116 may be smaller than inner backing layer 122 and cover layer 134, as shown in FIG. 1. so that inner backing layer may be coupled directly to cover layer 134 by an adhesive. In such a configuration, blister layer 110 and lidding layer 116 are sandwiched between inner backing layer 122 and lidding layer 116. It shall be understood that inner backing layer 122 may be coupled to lidding layer 116 directly by an adhesive. In the present embodiment, inner backing layer 122 is adhered with a permanent adhesive to outer peripheral portions of cover layer 134.

Another embodiment of a child resistant package 600 includes a plurality of unit dose packages 602 that are separable from one another. Each of the plurality of unit dose packages 602 includes the structure illustrated above with respect to child resistant package 100. For example, each unit dose package 602 includes a blister layer that defines a blister, a lidding layer covering the blister, an inner backing layer that covers the lidding layer and includes a first access system and an outer backing layer that covers the first lidding layer and includes a second access system. The second access system requires the user to perform multiple sequential steps to gain access to the first access system.

Figure 6:
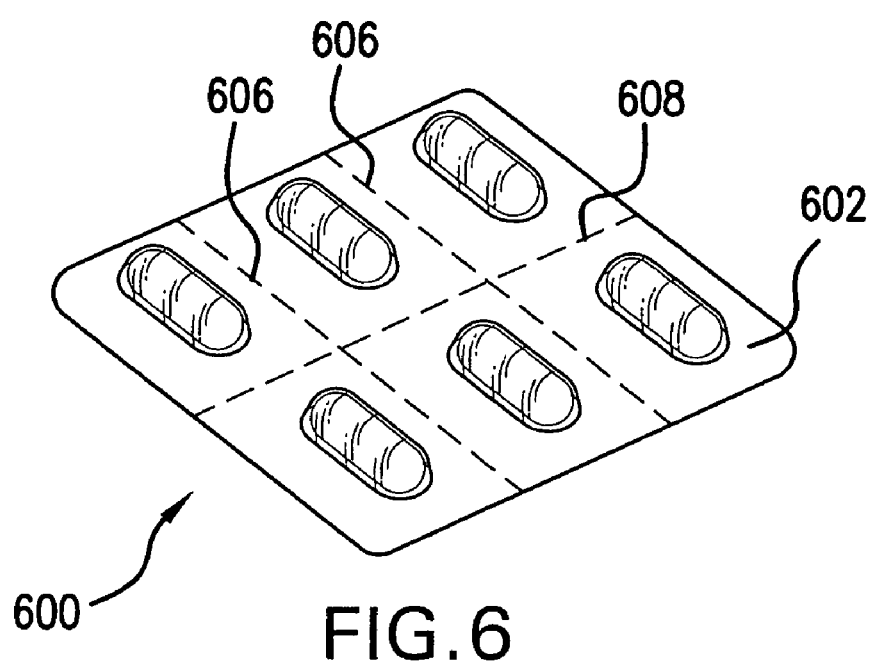
FIG. 6 is an isometric view of another embodiment of a child resistant package.

The separation of the unit dose packages 602 from package 600 is facilitated by transverse tear lines 606 and/or at least one longitudinal tear line 608. Transverse tear lines 606 and longitudinal tear line 608 may be formed by perforations or scoring that extend through all or a portion of the thickness of package 600. The layers of child resistant package 600 should be sealed together along transverse tear lines 606 and longitudinal tear lines 608 so that separation of unit dosage package 602 from the other unit dosage packages 602 of package 600 does not result in the housed medicament becoming easily accessible by separating the packaging layers. Transverse tear lines 606 and longitudinal tear line 608 are optional. It should also be appreciated that transverse and longitudinal tear lines may be configured such that blisters may be separable in groups rather than individually, as shown in FIG. 6.

Figure 7A:
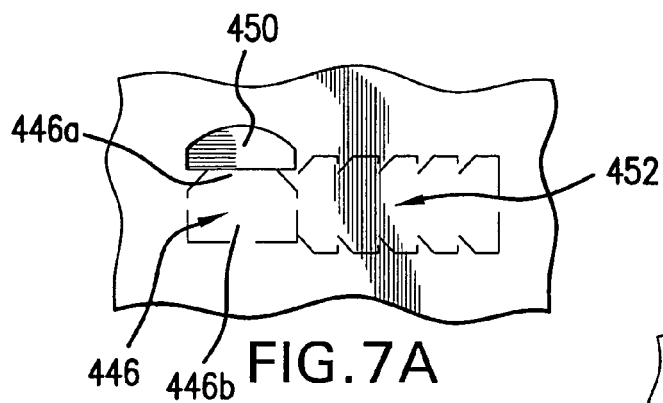
FIGS. 7A-7E illustrate the steps required to open the child resistant package of FIG. 1.

The procedure for opening child resistant package 100 includes a series of sequential steps that are illustrated in FIGS. 7A-7E. FIG. 7A shows a portion of package 100 with all of the child resistant features intact. In such a condition, lock tab 446, access hole 450 and cover tab 452 are accessible from a bottom surface 232 of outer backing layer 128. However, only first end 446a of lock tab 446 adjacent to access hole 450 may be grasped by a user.

Figure 7D:
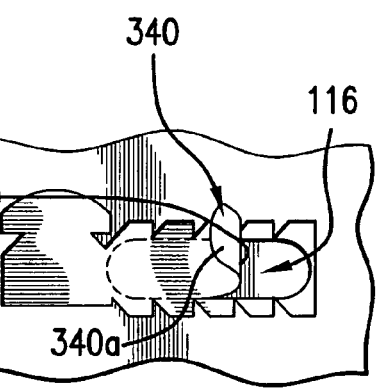
Figure 7B:
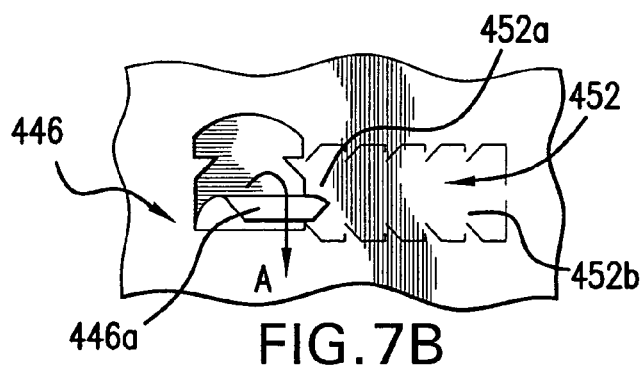

The first step of the procedure for opening package 100 requires a user to remove lock tab 446 by grasping first end 446a of lock tab 446 adjacent access hole 450 and peeling it in the direction of arrow A, as shown in FIG. 7B. After lock tab 446 is removed, first end 452a of cover tab 452 that was adjacent to lock tab 446 may be grasped by the user.

Figure 7E:
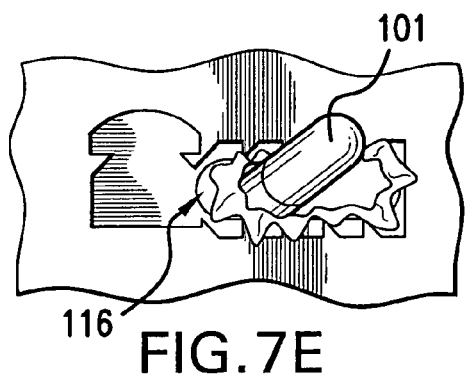
Figure 7C:
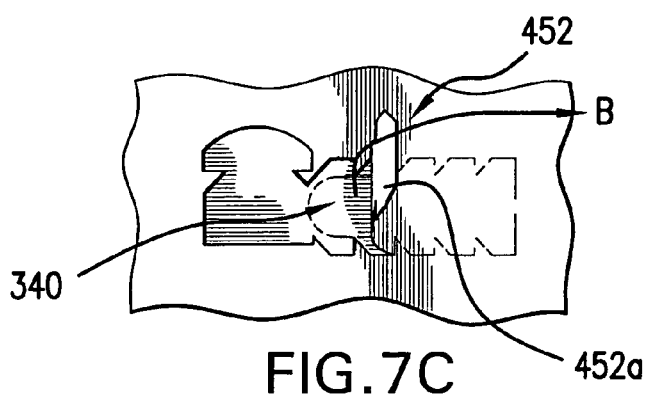

The next step is to remove cover tab 452 grasping first end 452a and peeling it in the direction of arrow B, as shown in FIG. 7C. After lock tab 446 and cover tab 452 are removed, access tab 340 and access hole 344 of inner backing layer 122 become exposed. It should be appreciated that lock tabs 446 and cover tabs 452 are removed by peeling them in different directions so that removal of a lock tab does not inadvertently result in the removal of the corresponding cover tab 452. In addition, it should be appreciated that access tab 340 is configured so that access hole 344 and first end 340a of access tab 340 become exposed only after removal of a corresponding cover tab 452.

The third step, illustrated in FIG. 7D is to remove access tab 340. Access tab 340 is removed by grasping first end 340a of access tab 340 accessible via access hole 344 and peeling it the direction of arrow C. After access tab 340 is removed, a portion of lidding layer 116 covering blister 104 is exposed. It should be appreciated that the direction of arrow B, shown in FIG. 7C, is opposite to the direction of arrow C. Such an orientation increases the defensive properties of package 100 by requiring the entire removal of cover tab 452 before removal of access tab 340.

The final step required to open package 100 is to rupture lidding layer 116, as shown in FIG. 7E. The user may push on blister 104 on top surface 212 of blister layer 110. Pushing blister 104 results in dosage 101 being forced through rupturable lidding layer 116 and becoming exposed.

Printing may be included on child resistant package 100. In particular, inner backing layer 122 may include printing 356, outer backing layer 128 may include printing 458, 460 and 462, and cover layer 134 may include printing 564, as shown in FIGS. 3-5. Printing 356, 458, 460 and 462, shown on inner backing layer 122 and outer backing layer 128, may include directions for opening child resistant package 100. For example, printing 462 may be a list of the required steps for opening package 100. Additionally, printing 356 may be included on access tabs 340, printing 460 may be included on cover tabs 452 and printing 458 may be included on lock tabs 446 so that references to particular tabs in printing 462 are easy to understand. Printing 564 on cover layer 134 or on outer backing layer 128 may include drug information such as the drug type, lot number, dosage, expiration date or any other labeling information for prescription or over-the-counter drug dosages. Although information is illustrated on the various components of package 100 using particular words in particular locations, it should be understood that directions for opening package 100 and/or the drug information may be printed in any visible location on the package and in any manner that would be apparent to one skilled in the art. Furthermore, it should be appreciated that words and/or symbols may be used.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A child resistant package, comprising:
   a blister layer having a top surface, a bottom surface and a plurality of blisters, wherein each of said plurality of blisters extends from said top surface;
   an inner backing layer having a top surface, a bottom surface, at least one separate access tab for each of said plurality of blisters disposed adjacent to the corresponding blister, and an access hole for each access tab, wherein said top surface of said inner backing layer is coupled to said bottom surface of said blister layer; and
   an outer backing layer having a top surface, at least one separate cover tab for each access tab, at least one separate lock tab for each cover tab, and an access hole for each lock tab wherein said top surface of said outer backing layer is coupled to said bottom surface of said inner backing layer,
   wherein each cover tab is disposed adjacent to the corresponding access tab and each lock tab is disposed adjacent to the corresponding cover tab.

2. The child resistant package of claim 1, wherein said top surface of said inner backing layer is directly coupled to said bottom surface of said blister layer.

3. The child resistant package of claim 1, further comprising:
   a rupturable lidding layer having a top surface and a bottom surface, wherein said top surface of said inner backing layer is coupled to said bottom surface of said blister layer via said lidding layer.

4. The child resistant package of claim 3, wherein said lidding layer is foil.

5. The child resistant package of claim 1, wherein said cover tabs and said lock tabs are defined by perforations in said outer backing layer.

6. The child resistant package of claim 1, further comprising:
   a cover layer having a bottom surface and an aperture corresponding to said blister, wherein said bottom surface of said cover layer is coupled to said top surface of said blister layer such that said blister extends through said aperture.

7. A child resistant package, comprising:
   a blister layer including a plurality of blisters;
   a lidding layer coupled to said blister layer; and
   a backing layer coupled to said lidding layer that includes a separate first access system for each of said plurality of blisters disposed adjacent to the corresponding blister and a separate second multi-step access system for each first access system disposed adjacent to the corresponding first access system,
   wherein each second access system is configured to communicate with the corresponding first access system such that each first access system is accessible via the corresponding second access system,
   wherein each first access system includes an access tab and an access hole, and
   wherein each second access system includes a lock tab, a cover tab, and an access hole.

8. The child resistant package of claim 7, wherein said backing layer includes an inner backing layer coupled to said lidding layer and an outer backing layer coupled to said inner backing layer, and wherein each first access system is disposed on said inner backing layer and each second access system is disposed on said outer backing layer.

9. A child resistant package, comprising:
   a blister layer including a plurality of blisters;
   an inner backing layer coupled to said blister layer and having a separate first access system for each of said plurality of blisters disposed adjacent to the corresponding blister; and
   an outer backing layer coupled to said inner backing layer and having a separate second access system for each first access system that includes multiple sequential peel tabs, that are disposed adjacent to the corresponding first access system, and are configured to communicate with the corresponding first access system such that each first access system is accessible via the corresponding second access system,
   wherein each first access system includes an access tab and an access hole, and
   wherein each second access system includes a lock tab, a cover tab, and an access hole.

* * * * *